United States Patent
Zimmer et al.

(10) Patent No.: US 7,451,301 B2
(45) Date of Patent: Nov. 11, 2008

(54) OS INDEPENDENT DEVICE MANAGEMENT METHODS AND APPARATUSES HAVING A MAP PROVIDING CODES FOR VARIOUS ACTIVATIONS OF KEYS

(75) Inventors: Vincent J. Zimmer, Federal Way, WA (US); Michael A. Rothman, Puyallup, WA (US)

(73) Assignee: Intel Corporation, Santa Clara, CA (US)

( * ) Notice: Subject to any disclaimer, the term of this patent is extended or adjusted under 35 U.S.C. 154(b) by 470 days.

(21) Appl. No.: 11/095,151

(22) Filed: Mar. 30, 2005

(65) Prior Publication Data

US 2006/0230280 A1    Oct. 12, 2006

(51) Int. Cl.
*G06F 9/00* (2006.01)
*H04K 1/00* (2006.01)
(52) U.S. Cl. ................................. 713/1; 713/2; 713/182
(58) Field of Classification Search ................ 713/1, 713/2, 100, 182; 709/203, 222
See application file for complete search history.

(56) References Cited

U.S. PATENT DOCUMENTS

| | | | | |
|---|---|---|---|---|
| 5,706,349 | A * | 1/1998 | Aditham et al. | 713/159 |
| 5,828,831 | A * | 10/1998 | Kong | 726/18 |
| 6,304,895 | B1 * | 10/2001 | Schneider et al. | 709/203 |
| 6,324,644 | B1 * | 11/2001 | Rakavy et al. | 713/1 |
| 6,463,530 | B1 * | 10/2002 | Sposato | 713/2 |
| 6,938,155 | B2 * | 8/2005 | D'Sa et al. | 713/160 |
| 2004/0103175 | A1 * | 5/2004 | Rothman et al. | 709/222 |

* cited by examiner

*Primary Examiner*—Suresh K Suryawanshi
(74) *Attorney, Agent, or Firm*—Schwabe, Williamson & Wyatt, P.C.

(57) ABSTRACT

An apparatus adapted to facilitate remote configuration and/or management of a system, independent of its operating system, is disclosed. In various embodiments, the apparatus includes a first and a second interface coupled to an input device and a network interface of the system respectively, and a controller.

10 Claims, 6 Drawing Sheets

302a – 302i

OS INDEPENDENT DEVICE MANAGEMENT METHODS AND APPARATUSES HAVING A MAP PROVIDING CODES FOR VARIOUS ACTIVATIONS OF KEYS

FIELD OF THE INVENTION

The present invention relates generally to the field of computing devices, and, in particular, to management of such devices.

BACKGROUND OF THE INVENTION

Advances in microprocessor and related technologies have led to wide spread deployment and adoption of numerous general purpose as well as special purpose computing devices. General purpose computing devices, such as servers and desktop computers, are now endowed with computing power that was once reserved for the most expensive high end computers, requiring special conditioned environments to operate. At the same time, advances in networking, telecommunication, satellite, and other related technologies have also led to an increase in connectivity between computing devices, making possible networked computing over private and/or public networks, such as the Internet.

Conventionally, computing devices are managed by/through their operating systems. The management tasks may include device configuration, controlling user access (by authorized users only), logging various system activities, and so forth. As technology and applications continue to evolve in sophistication, the task of managing a computing device has become increasingly complex. Further, it is often necessary or desirable to manage a computing device when the operating system is non-operational ("frozen"), or otherwise unavailable.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Illustrative embodiments of the present invention include but are not limited to operating system independent methods for managing a computing device, components contributing to the practice of these methods, in part or in whole, and devices endowed with such components.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising", "having", and "including" are synonymous, unless the context dictates otherwise.

Figure 1:
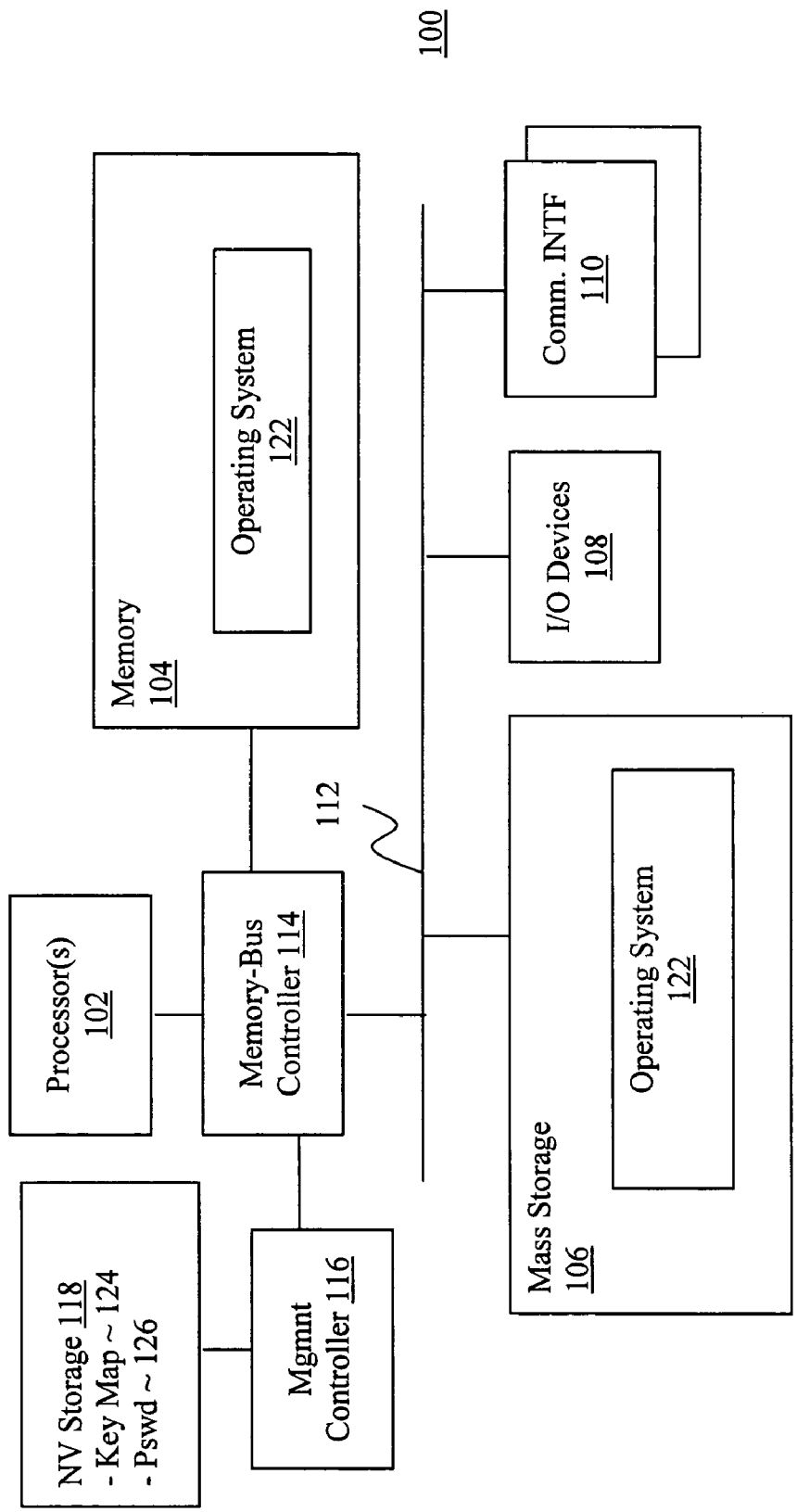
FIG. 1 illustrates an overview of the invention, in accordance with various embodiments.

Referring now to FIG. 1, wherein an overview of the present invention, in accordance with various embodiments, is shown. As illustrated, for the embodiments, computing device 100 includes processor 102, memory 104, memory-bus controller 114, and bus 112, coupled to each other as shown. Additionally, computing device 100 includes mass storage device 106, input/output (I/O) devices 108, and communication interfaces 110 coupled to each other, and the earlier described elements as shown. Memory 104 and mass storage device 106 include in particular, temporal and persistent copies of operating system 122 respectively. In various embodiments, I/O devices 108 include an output device, such as a display, for locally outputting data, including outputting of a prompt for user authentication (e.g. during a log-in process), and an input device, such as a keyboard, for locally inputting data, including inputting of authentication information by a user (e.g. during the log-in process). In various embodiments, communication interfaces 110 include a networking interface coupling computing device 100 to a network, to facilitate communication with a remote user, a remote user authentication, device configuration, and/or management service. In various embodiments, the remote user authentication service, remote device configuration service and remote management service, may be separated or combined services.

Further, computing device 100 is endowed with management controller 116 and non-volatile storage 118, coupled to each other and the earlier described elements as shown. For the embodiments, non-volatile storage 118 further has key map 124 and user authentication information (such as, passwords) 126 stored therein. As will be described in more detail below, management controller 116 is adapted to manage computing device 100, independent of operating system 122, that is, irrespective of its availability or operational state. More specifically, for the embodiments, management controller 116 is adapted to use the data/information stored in non-volatile storage 118, when managing computing device 100, independent of operating system 122 (hereinafter, for ease of understanding, simply "managing computing device 100").

In various embodiments, management controller 116 includes an I/O interface (not shown) for interfacing with memory-bus controller 114, enabling it, among other things, to be operatively coupled to I/O devices 108 and communication interfaces 110. In other embodiments, management controller 116 may be coupled to I/O devices 108 and/or communication interfaces 110 directly, without going through memory-bus controller 114. In still other embodiments, management controller 116 may be integrated with memory-bus controller 114 and/or other components.

Additionally, computing device 100 is adapted such that, it may be powered on remotely (e.g. "powering on" computing device 100, through a network interface having a power saving, never off, "sleep" mode of operation). At power-on, a power-on or start-up signal is provided to management controller 116 as well as to processor 102. As will be described in more detail below, management controller 116 is adapted to perform a number of user authentication operations, and provides processor 102 with a "user authenticated" signal, on successful authentication of the user causing the start-up. Processor 102 is adapted to wait for the "user authenticated" signal before performing the conventional start up of operating system 122.

Except for the logic provided to management controller 116, the data/information stored in non-volatile storage 118, and the modified behavior of processor 102, each of the earlier described elements represents a broad range of the corresponding element known in the art or to be designed consistent with the teachings of the present invention. They perform their conventional functions, i.e. processing, storage, and so forth. For example, operating system 122 is adapted to perform its conventional function of managing computing device 100.

In various embodiments, computing device 100 may have more or less elements, and/or different architectures. In various embodiments, computing device 100 may be a desktop computer, a tablet computer, a palm sized computing device, a set-top box, or a media player (e.g. a CD or DVD player).

Figure 2A:
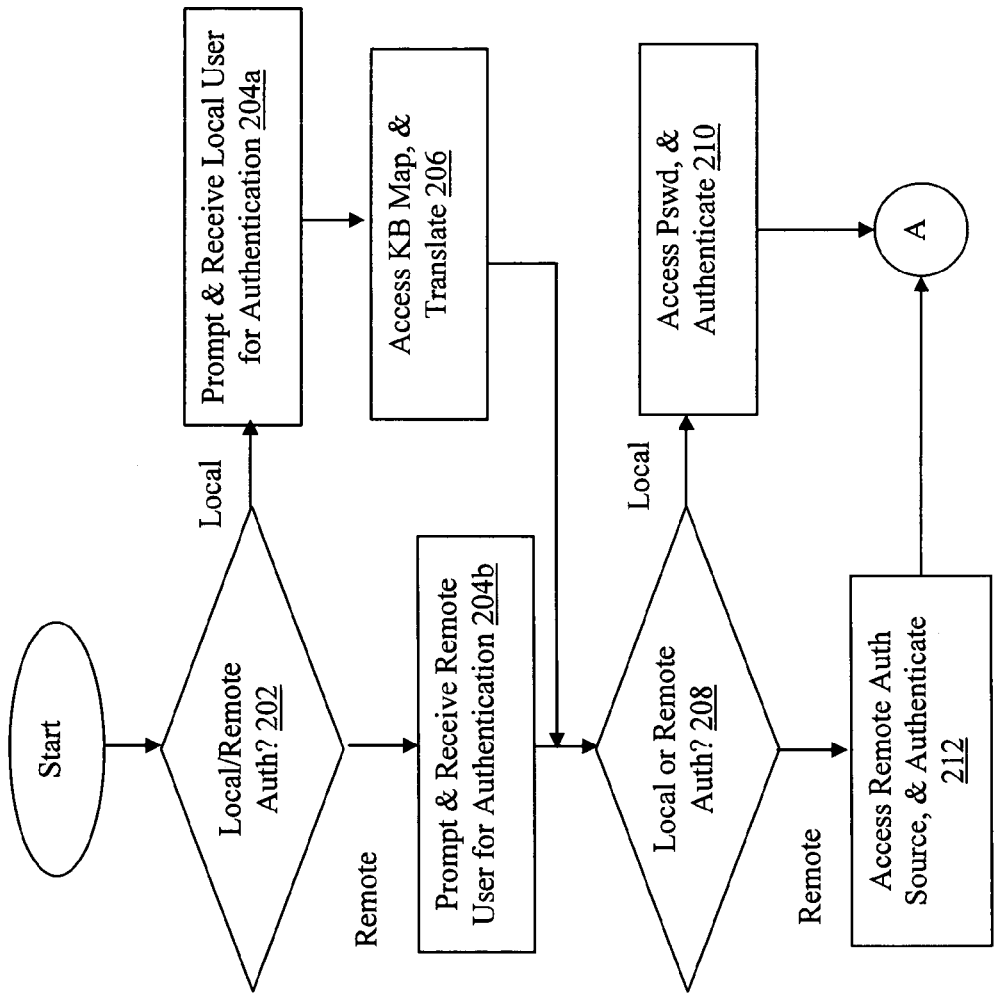
FIGS. 2a-2c illustrate a flow chart view of the operational flow of the management controller of the host device of FIG. 1 in accordance with various embodiments.
Figure 2B:
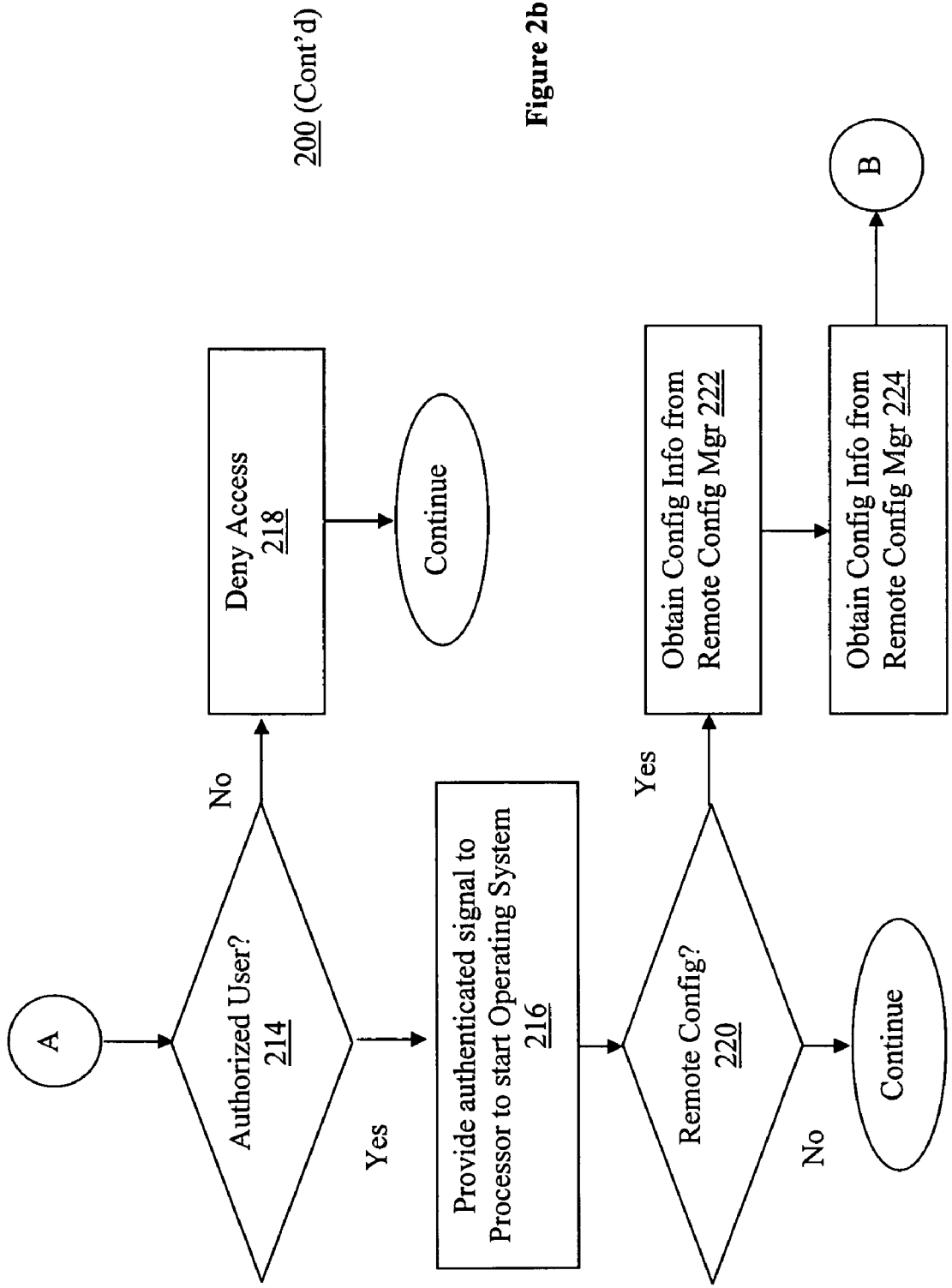
Figure 2C:
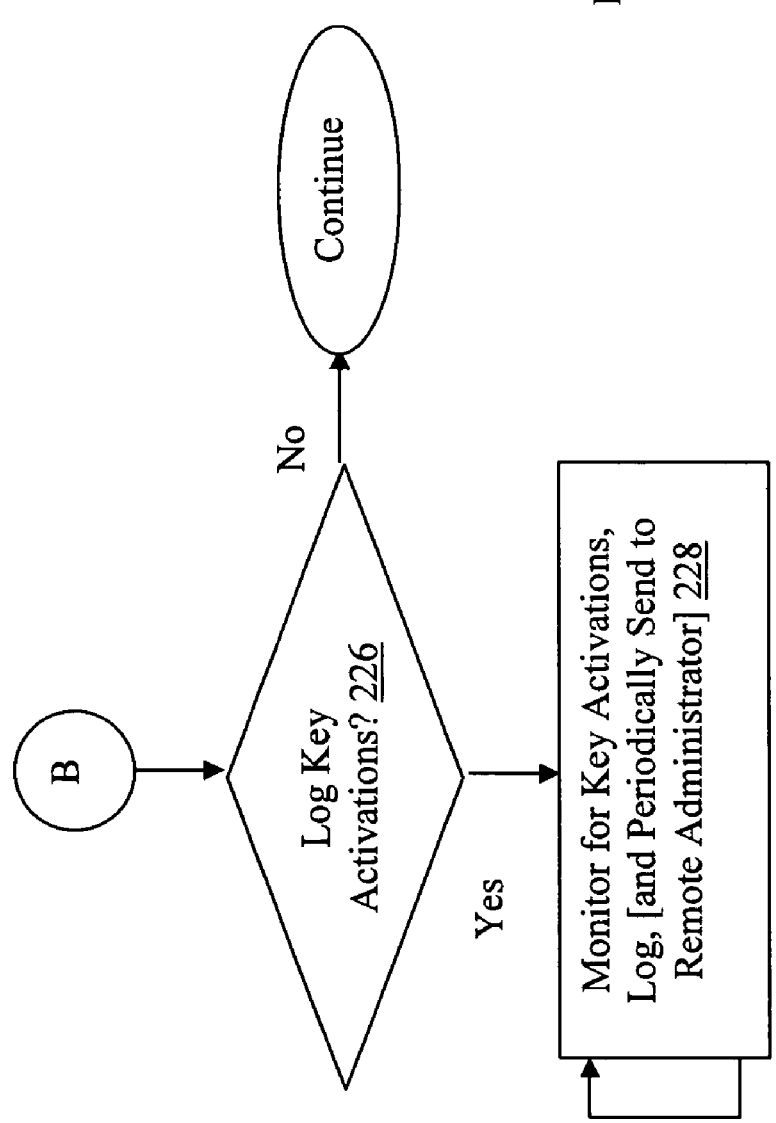

Referring now to FIG. 2a-2c wherein a flow chart view of portions of the operations performed by management controller 116 is shown. As illustrated, on start-up, e.g. power on, management controller 116 determines whether the start-up is caused locally or remotely, block 202, and proceeds to prompt the local/remote user for authentication accordingly, e.g. initiating a log-in process requesting for the local/remote user's password to authenticate the local/remote user causing the start-up is indeed an authorized user, block 204a or 204b. The prompting of the local/remote user for authentication information may be performed in any one of a number of known or to be designed techniques.

Figure 3:
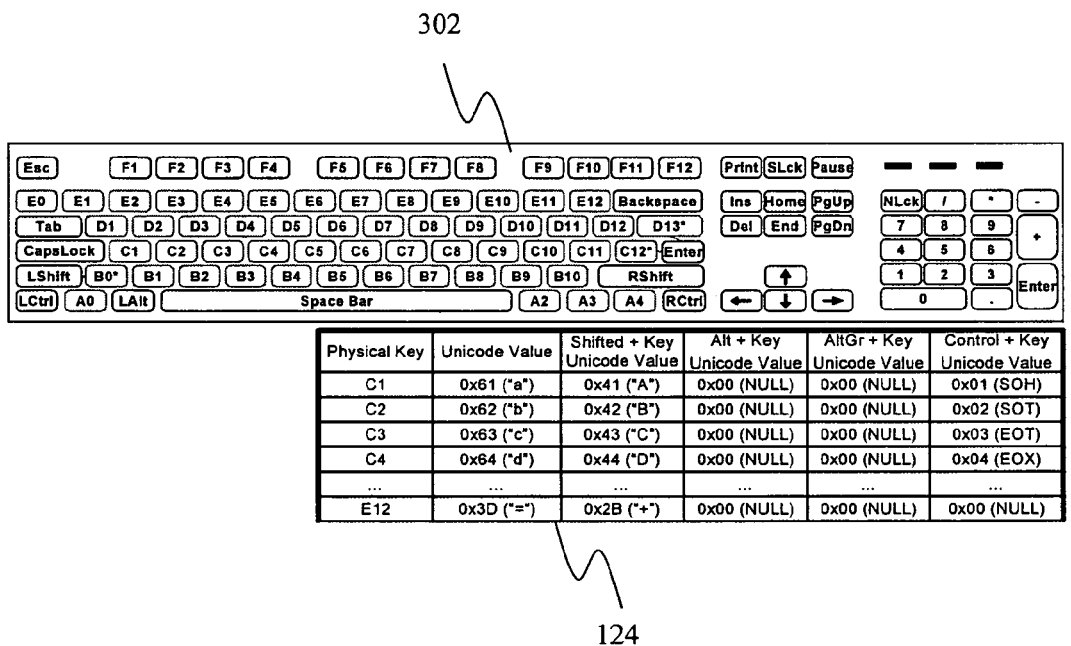
FIG. 3 illustrates an example keyboard and an example key map of FIG. 1, in accordance with various embodiments.
Figure 4:
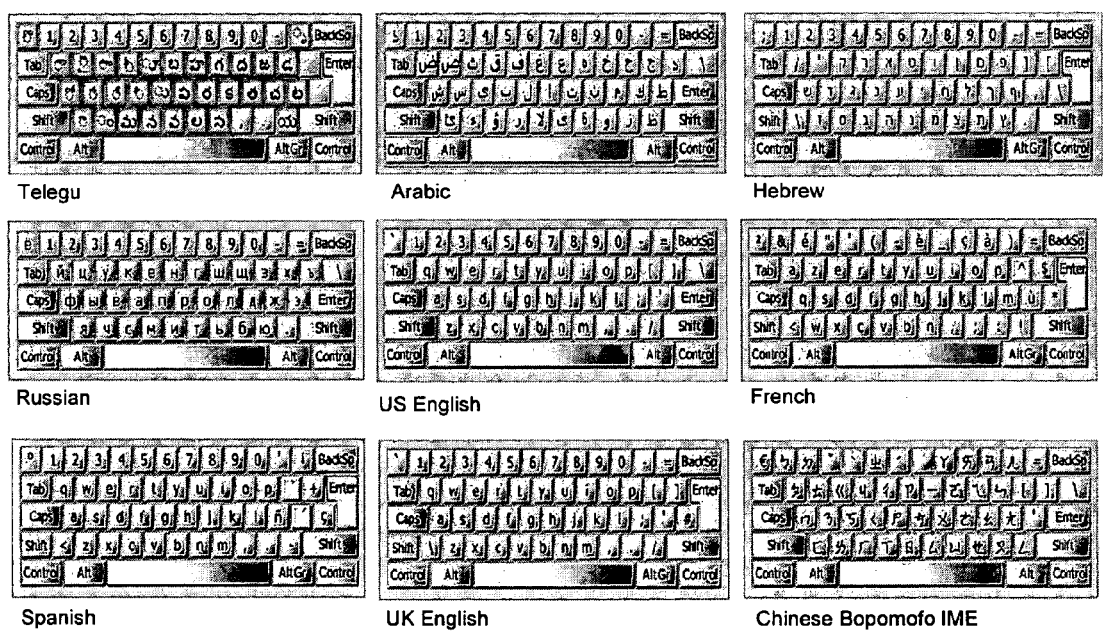
FIG. 4 illustrates additional example keyboards.

Thereafter, on receipt of the authentication information being presented by a local user (e.g. a sequence of signals representative of a sequence of activation of keys of a keyboard to input a password), management controller 116 accesses key map 124 stored in non-volatile storage 118 and uses key map 124 to generate a series of codes representative of the authentication information (e.g. password) entered. In various embodiments, key map 124 provides the various unicodes to be generated for various key activations, and management controller 116 generates them accordingly, during operation 206. An example keyboard 302 and its corresponding version of key map 124 are shown in FIG. 3. Accordingly, keyboard 302 may be a wide range of keyboards 302a-302i of different languages, as illustrated in FIG. 4.

For the embodiments, the access and translate operations of block 206 is not performed in the case where the start-up is caused by a remote user. The embodiments assume the authentication information is presented by the remote user in unicodes. In alternate embodiments, the authentication information may also be presented in non-unicodes, requiring management controller 116 to perform the translation as in the case of a local user. In still other embodiments, other code schemes with or without translation may be practiced instead.

Continuing to refer to FIGS. 2a-2c, upon either receiving and translating the authentication information in the desired coding format, block 204a and 206, or receiving the authentication information in the desired coding format, block 204b, for the embodiments, management controller 116 determines whether it is configured to locally authenticate the user or authenticate the user with a remote authentication source, block 208. In alternate embodiments, management controller 116 may be practiced with a pre-configuration of local or remote configuration, eliminating the need for dynamic configuration.

For the embodiments, on determining that it is to authenticate the local/remote user locally, management controller 116 accesses the reference authentication information (e.g. password) pre-stored in non-volatile storage 118, and authenticates the local/remote user causing the start-up, block 210. On the other hand, on determining that it is to authenticate the local/remote user remotely, management controller 116 provides the received (and translated) authentication information (e.g. password) pre-stored to the remote authentication authority to authenticate the local/remote user causing the start-up, block 212.

Next, at block 214, management controller 116 determines whether the local/remote user causing the start-up is an authorized user, block 214. For the embodiments, if the local/remote user is determined to be an authorized user, management controller 116 provides processor 102 with the "authenticated" signal, to cause processor 102 to proceed with conventional start-up of operating system 122, block 216.

On the other hand, if management controller 116 does not determine the local/remote user causing the start-up to be an unauthorized user, for the embodiments, management controller 116 denies access to the unauthorized user (e.g. by not providing processor 102 with the "authenticated" signal), block 218. Thereafter, management controller 116 may continue its operation in any one of a number of implementation manners. For example, management controller 116 may simply cause computing device 100 to power off, or otherwise shut down.

Returning to block 216, where processor 102 is provided with the "authenticated" signal, and proceeds with starting operating system 122 in a convention manner, assuming the start up process was performed successfully, computing device 100 becomes operational.

For the embodiments, concurrently during the start up process, management controller 116 determines if it is configured to contact a remote configuration manager for configuration information to dynamically configure computing device 100, block 220.

If it is determined that management controller 116 is to contact a remote configuration manager for configuration information to dynamically configure computing device 100, management controller 116 contacts the remote configuration manager, obtains the configuration information, and configures computing device 100 accordingly, blocks 222-224.

For the various embodiments, on configuring computing device 100, management controller 116 determines whether it is to monitor, log and report key activations, during the operation of computing device 100, block 226. If it is determined that, management controller 116 is to monitor, log and report key activations, during the operation of computing device 100, management controller 116 monitors, logs and reports key activations (e.g. periodically, after a predetermined time period, or a predetermined amount of logged key activations), during the operation of computing device 100, block 228.

On the other hand, if it is determined at block 226 that management controller 116 is not configured to contact a remote configuration manager for configuration information to dynamically configure computing device 100, management controller 116 continues with "other" operations, if any.

Similarly, back at block 220, if it is determined that management controller 116 is not configured to contact a remote configuration manage for configuration information to dynamically configure computing device 100, management controller 116 continues with "other" operations, if any.

Accordingly, management controller 116 is able to manage computing device 100, including but not limited to, e.g. authentication of a local/remote user, dynamically configuring computing device 100, and/or performing one or more managing functions, such as monitoring, logging, and reporting key activations during operation, independent of operating system 122, i.e. regardless of its operational state or availability.

Additionally, it should be noted that, in various embodiments, the remote authentication source and the remote configuration manager may be different or one of the same.

Although specific embodiments have been illustrated and described herein, it will be appreciated by those of ordinary skill in the art that a wide variety of alternate and/or equivalent implementations may be substituted for the specific embodiments shown and described, without departing from the scope of the present invention. This application is intended to cover any adaptations or variations of the embodiments discussed herein. Therefore, it is manifestly intended that this invention be limited only by the claims and the equivalents thereof.

What is claimed is:

1. An apparatus, comprising:
   a first input/output (I/O) interface adapted to interface the apparatus to an input device of a system having the input device, a first storage, an operating system stored in the first storage, and a processor coupled to the input device and the first storage;
   a second I/O interface adapted to interface the apparatus to a network; and
   a controller coupled to the first and second interfaces, and adapted to regulate start up of the operating system of the system by an authorized user only, through either the first or second interface; and
   a third I/O interface adapted to interface the apparatus to a second storage of the system having a map that provides codes for various activations of keys of the input device, wherein the controller is configured to translate activations received through the first I/O interface to authentication information of a local user based at least on the map.

2. The apparatus of claim 1, wherein reference authentication information is stored in the second storage and the reference authentication information comprises a pre-stored password and the authentication information comprises a user inputted password.

3. The apparatus of claim 2, wherein the controller is adapted to receive authorization information of a remote user through the second I/O interface.

4. The apparatus of claim 3, wherein the system further comprises a network interface, and the second I/O interface is coupled to the network interface, enabling the remote authorized user to present his authentication information to the controller through the network and second I/O interfaces.

5. The apparatus of claim 3, wherein the apparatus further comprises a fourth I/O interface adapted to interface the apparatus to the second storage of the system having the reference authentication information, wherein the controller is adapted to process the authentication information presented by the remote user using the reference authentication information.

6. The apparatus of claim 3, wherein the controller is adapted to authenticate whether a user is an authorized user with a remote authentication service through the second I/O interface.

7. The apparatus of claim 3, wherein the controller is further adapted to obtain configuration information for configuring the system from a remote configuration administrator through the second I/O interface.

8. The apparatus of claim 1, wherein the controller is further adapted to log the activations of keys of the input device, after start up of the operation system, through the first I/O interface if the system is to be configured to operate with a key logging option, and to forward the logged key activations to a remote device through the second I/O interface.

9. The apparatus of claim 1, wherein the system further comprises a memory-bus controller, to which the input device, the storage and the processor are coupled, wherein the apparatus is a discrete component, coupled to the memory-bus controller through the first I/O interface.

10. The apparatus of claim 1, wherein the apparatus is a memory-bus controller of the system to which the storage and the processor are also coupled.

\* \* \* \* \*